United States Patent [19]

Shannon

[11] Patent Number: 5,104,083
[45] Date of Patent: Apr. 14, 1992

[54] AUTOMOTIVE CLOTHES HANGER BRACKET

[76] Inventor: Brian P. Shannon, 7159 Neff, Houston, Tex. 77074

[21] Appl. No.: 712,572

[22] Filed: Jun. 10, 1991

[51] Int. Cl.$^5$ .............................................. B42F 13/00
[52] U.S. Cl. .................................. 248/339; 211/105.1; 224/42.46 A; 224/313
[58] Field of Search ............... 248/339, 340, 214, 208; 211/123, 105.1, 105.3, 105.4, 118; 224/311, 313, 42.45 A, 42.46 A, 42.46 R

[56] References Cited

U.S. PATENT DOCUMENTS

| | | | |
|---|---|---|---|
| 1,917,588 | 7/1933 | Johnson | 224/313 X |
| 2,157,001 | 5/1939 | Morley | 224/42.45 A |
| 2,344,339 | 3/1944 | Zwald | 224/42.45 A X |
| 2,516,617 | 7/1950 | Coughlin | 224/42.45 A |
| 3,002,666 | 10/1961 | Silverman | 211/123 X |
| 3,145,849 | 8/1964 | Hanson | 211/105.1 |
| 3,708,093 | 1/1973 | Toms | 224/42.45 A |
| 4,778,089 | 10/1988 | White | 224/313 X |
| 4,863,081 | 9/1989 | Gabbert | 224/313 X |

Primary Examiner—J. Franklin Foss
Attorney, Agent, or Firm—Kenneth A. Roddy

[57] ABSTRACT

A removable and adjustable clothes hanger bracket for mounting on a fixed garment hook in the interior of a vehicle to increase garment carrying capacity. The bracket includes a flat rectangular base plate and a detachable flat triangular hanger extension. The base plate has an adjustable opening at its upper end for hanging it on the fixed garment hook and a slotted portion and support portion on its front surface. The hanger extension member is removably received in the slotted and support portions of the base plate and has an outer end extending upwardly and outwardly therefrom with a notched top edge for supporting a plurality of garment hangers and a hooked portion at the outer end. A pair of removable tabs disposed in the rectangular opening of the base plate allow the size of the opening to be selectively altered to receive different sizes of fixed garment hooks. A support adapter accessory is also provided which is slidably and removably received on the base plate and extends rearwardly therefrom to contact the interior trim of the vehicle adjacent the fixed garment hook. The rearward extension of the support adapter is adjustable to stabilize and support the rectangular base plate in a generally vertical position against various types of automobile interior trim profiles. When properly installed, the base plate is positioned generally vertically and the hanger extension extends outwardly and angularly upward from the base plate.

11 Claims, 2 Drawing Sheets

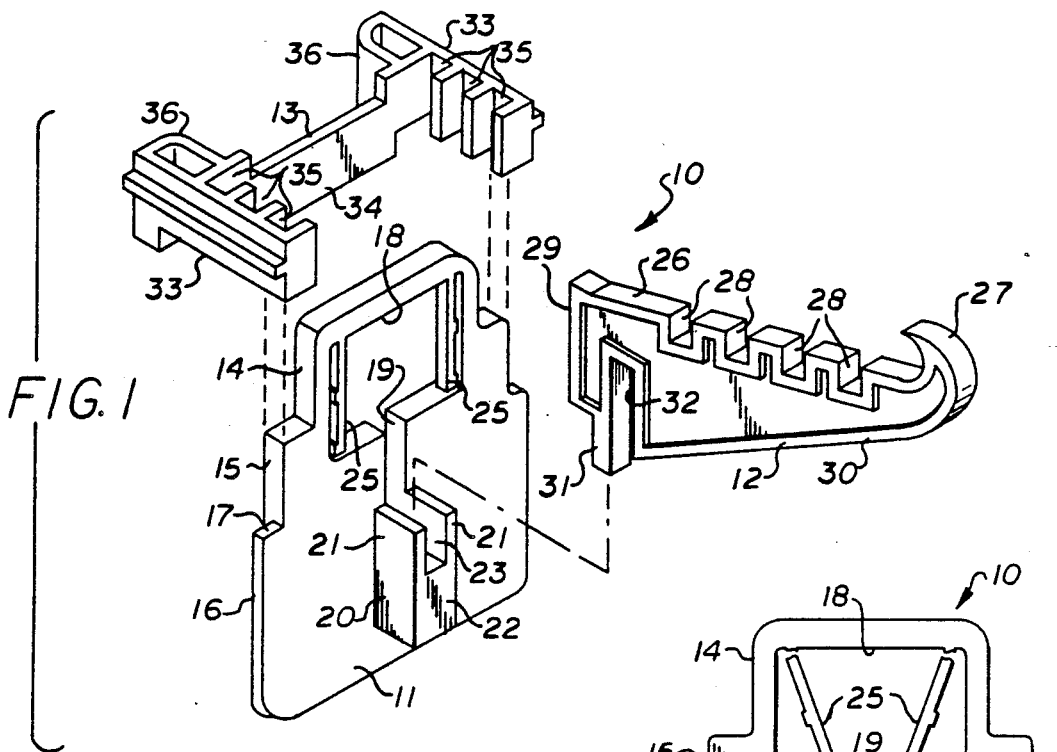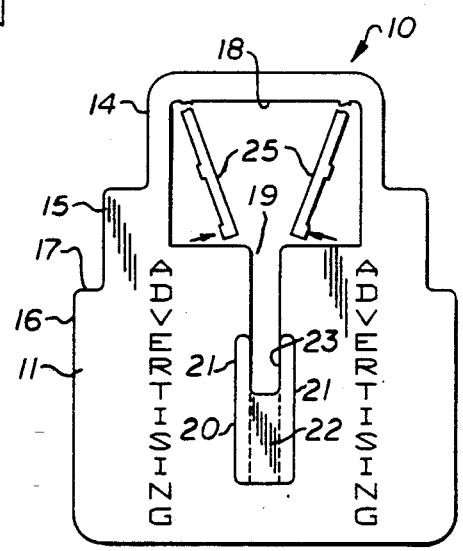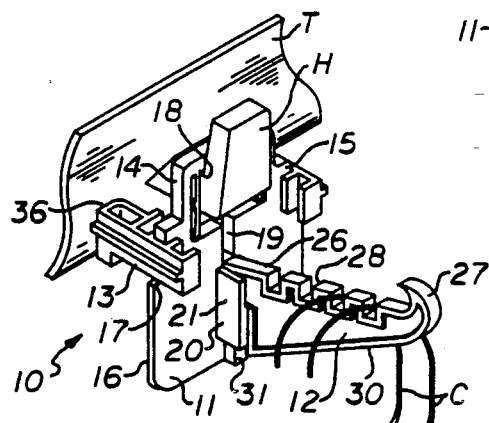

AUTOMOTIVE CLOTHES HANGER BRACKET

BACKGROUND OF THE INVENTION

1. Field of the Invention

This invention relates generally to automobile garment hanger brackets, and more particularly to a clothes hanger bracket having a base plate which is hung from an existing automobile garment hanging hook, an outwardly extending hanger extension to receive conventional clothes hangers, and a support adapter accessory to additionally support the base plate against the automobile interior trim.

2. Brief Description of the Prior Art

Many automobiles are equipped with small garment hooks located near the ceiling of the vehicle above the rear side windows or rear portion of the automobile. These small garment hooks only hold a single garment or a small number of garment hangers. Due to the small size and sometimes awkward location of the hook, it is often difficult to hang or remove garments from the hook. Because the existing hooks are incapable of holding a large number of garments, they are not suitable for use when traveling, picking up garments from the dry cleaners, and other times when large hanging capacity is desired.

Others have attempted to solve the small hanging capacity problem of the existing automobile garment hooks. One type of garment hanging device comprises an elongate bar which is supported at opposite ends on the existing hooks and extends from side-to-side across the rear portion of the automobile. However, when in use, the large number of garments supported on the bar obstructs the driver's view through the rear window, and prevents use of the back seat for passengers. U.S. Pat. Nos. 2,532,907 and 2,617,571 to Hart disclose other bar type garment hanging devices.

Seidler, U.S. Pat. No. 2,528,794 and Kramer, U.S. Pat. No. 2,728,503 disclose garment hangers which utilize only one side of the vehicle for the hanging garments. However, these hangers are complex constructions and could not be manufactured economically.

Silverman, U.S. Pat. No. 3,002,666, Robertson, U.S. Pat. No. 3,275,161, and Toms, II, U.S. Pat. No. 3,708,093 disclose garment hangers which are supported on one of the existing vehicle garment hooks. These devices lack lateral support and stability and are subject to swinging or pivoting as the vehicle moves. These devices also are not adaptable to fit various sizes of existing vehicle hooks.

White et al, U.S. Pat. No. 4,778,089 discloses a telescoping rod which is adapted to be supported on the existing vehicle garment hook or beneath an interior grab bar of the vehicle. This device also lacks lateral support and stability and is subject to swinging or pivoting as the vehicle moves.

The shape and size of the existing garment hooks varies with the make and model of the automobile and commercially available garment hanging devices may fit one automobile hook but not another.

Gabbert, U.S. Pat. No. 4,863,081 discloses a garment hanging rack which is designed to overcome the stability problem and, to some extent, offers some adjustability to fit various makes and models of automobiles. However, the Gabbert device is fairly complex in construction and would be expensive and difficult to manufacture.

The present invention is distinguished over the prior art in general, and these patents in particular by a removable and adjustable clothes hanger bracket for mounting on a fixed garment hook in the interior of a vehicle to increase garment carrying capacity. The bracket includes a flat rectangular base plate and a detachable flat triangular hanger extension. The base plate has an adjustable opening at its upper end for hanging it on the fixed garment hook and a slotted portion and support portion on its front surface. The hanger extension member is removably received and supported in the slotted and support portions of the base plate and has an outer end extending upwardly and outwardly therefrom with a notched top edge for supporting a plurality of garment hangers and a hooked portion at the outer end. A pair of removable tabs disposed in the rectangular opening of the base plate allow the size of the opening to be selectively altered to receive different sizes of fixed garment hooks. A support adapter accessory is also provided which is slidably and removably received on the base plate and extends rearwardly therefrom to contact the interior trim of the vehicle adjacent the fixed garment hook. The rearward extension of the support adapter is adjustable to stabilize and support the rectangular base plate in a generally vertical position against various types of automobile interior trim profiles. When properly installed, the base plate is positioned generally vertically and the hanger extension extends outwardly and angularly upward from the base plate.

SUMMARY OF THE INVENTION

It is therefore an object of the present invention to provide an automobile clothes hanger bracket adapted to be received on the existing garment hook of a vehicle which will greatly increase the number of garments which can be hung therefrom.

It is another object of this invention to provide an automobile clothes hanger bracket adapted to be received on the existing garment hook of a vehicle which is easily adapted to fit a large variety of different sizes of existing interior garment hooks and interior trim moldings.

Another object of this invention is to provide an automobile clothes hanger bracket adapted to be received on the existing garment hook of a vehicle which is quickly and easily assembled and disassembled without tools.

Another object of this invention is to provide an automobile clothes hanger bracket adapted to be received on the existing garment hook of a vehicle which can be stored in a small compact package in the disassembled condition.

A further object of this invention is to provide an automobile clothes hanger bracket which is received and securely supported in a stable position on the existing garment hook and against the interior trim of a vehicle and which will not pivot or sway as the vehicle moves.

A still further object of this invention is to provide an automobile clothes hanger bracket adapted to be received on the existing garment hook of a vehicle which is simple in construction, economical to manufacture and rugged in use.

Other objects of the invention will become apparent from time to time throughout the specification and claims as hereinafter related.

The above noted objects and other objects of the invention are accomplished by a removable and adjustable clothes hanger bracket for mounting on a fixed garment hook in the interior of a vehicle to increase garment carrying capacity. The bracket includes a flat rectangular base plate and a detachable flat triangular hanger extension. The base plate has an adjustable opening at its upper end for hanging it on the fixed garment hook and a slotted portion and support portion on its front surface. The hanger extension member is removably received in the slotted and support portions of the base plate and has an outer end extending upwardly and outwardly therefrom with a notched top edge for supporting a plurality of garment hangers and a hooked portion at the outer end. A pair of removable tabs disposed in the rectangular opening of the base plate allow the size of the opening to be selectively altered to receive different sizes of fixed garment hooks. A support adapter accessory is also provided which is slidably and removably received on the base plate and extends rearwardly therefrom to contact the interior trim of the vehicle adjacent the fixed garment hook. The rearward extension of the support adapter is adjustable to stabilize and support the rectangular base plate in a generally vertical position on various types of interior trim profiles. When properly installed, the base plate is positioned generally vertically and the hanger extension extends outwardly and angularly upward from the base plate.

BRIEF DESCRIPTION OF THE DRAWINGS

FIG. 1 is an exploded isometric view of the automobile clothes hanger bracket in accordance with the present invention shown in a disassembled condition.

FIG. 2 is an exploded isometric view of the automobile clothes hanger bracket in the assembled condition and installed on the automobile garment hook and against the interior trim.

FIG. 3 is a front elevation view of the base plate of the automobile clothes hanger bracket showing how the tabs are removed from the opening.

DESCRIPTION OF THE PREFERRED EMBODIMENT

Figure 4:
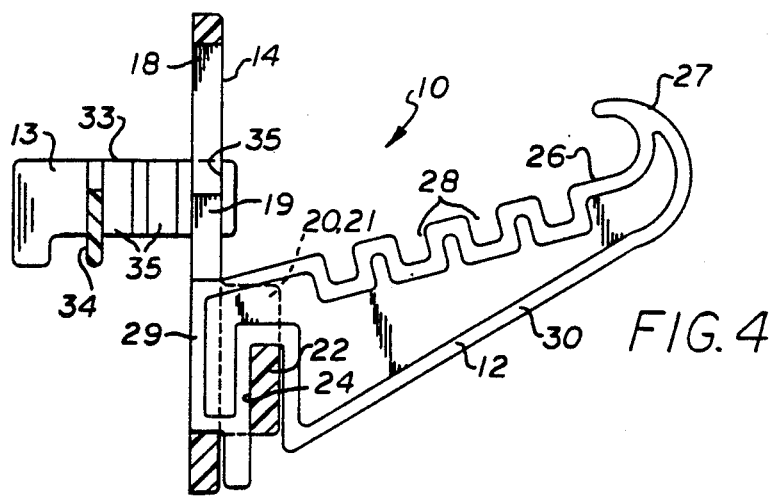
FIG. 4 is a longitudinal cross section through the base plate showing the hanger extension member and the support adapter member assembled on the base plate.

Referring to the drawings by numerals of reference there is shown in FIGS. 1, 2, 3, and 4, a preferred automobile clothes hanger bracket 10. FIG. 1 shows the hanger bracket 10 in an unassembled condition and FIG. 2 shows the hanger bracket in an assembled condition and installed on an existing automobile garment hook H and supported against the automobile interior trim T.

The clothes hanger bracket 10 includes a generally rectangular base plate 11 which is received o the existing automobile garment hook H and an outwardly extending hanger extension member 12 which is removably connected to the base plate. A support adapter member 13 is provided as an accessory to allow the base plate 11 to be properly positioned against various shapes of interior automobile trim, as explained hereinafter. The base plate 11, hanger extension 12, and support adapter 13 are preferably formed of rigid molded plastic.

The base plate 11 is a generally flat rectangular member having an upper portion 14, an intermediate portion 15 therebelow which is wider than the upper portion 14, and a lower portion 16 which is wider than the intermediate portion 15 and forms a stop shoulder 17 therebetween. A central rectangular opening 18 extends through the upper portion 14 of the base plate 11 to receive the existing automobile garment hook H.

A relatively narrow vertical slot 19 extends downwardly a distance from the bottom edge of the opening 18 in the base plate 11. A rectangular support block 20 is formed on the front surface of the lower portion 16 of the base plate 11. The support block 20 has parallel side walls 21 which extend outwardly from the front surface of the base plate 11 at each side of the lower portion of the vertical slot 19 and has a front wall 22 spaced outwardly from the slot 19. The front wall 22 is provided with another vertical slot 23 which is approximately the same width as the slot 19 in the base plate. As best seen in FIG. 4, the front wall 22 of the support block 20 forms a rectangular opening 24 in the interior of the support block.

A pair of thin elongate tabs 25 spaced laterally inward from the side edges of the opening 18 extend downwardly from the top edge of the opening. The tabs 25 adapt the opening 18 to be received on existing automobile garment hooks of the majority of makes and models of automobiles. Since a small percentage of automobiles have a wider garment hook than the majority having a somewhat standard width, the tabs 25 can be removed. With the tabs 25 removed, the width of the opening 18 is increased whereby the base plate 11 can be received on the wider garment hooks.

As seen in FIG. 3, the tabs 25 can be removed by bending the lower portions of the tabs inwardly until they break off of the base plate 11. Thus, the base plate 11 can be adapted to fit existing garment hooks of nearly all makes and models of automobiles. When the tabs 25 are left in the opening 18, they prevent the opening from being unnecessarily wide, which would cause undesirable lateral movement or rotation of the base plate 11 relative to the existing garment hook.

The hanger extension member 12 is a generally flat triangular-shaped configuration having a top edge 26 with a hooked portion 27 at the apex or outward end of the triangular shape. A plurality of notches 28 are formed along the length of the top edge 26 to receive the hooked portion of conventional clothes hangers C. The notches 28 maintain the clothes hangers evenly spaced along the length of the hanger extension member 12 during use, and the end hook portion 27 prevents a clothes hanger from falling off the hanger extension member should it accidentally come out of a notch. The hooked end portion 27 is also useful for hanging caps and hats from the device. The base or inward end 29 of the triangular shape is flat and is shaped to be received in the vertical slot 19 of the base plate 1 (FIGS. 1 and 4). The bottom edge 30 and top edge 26 of the triangular shape extend angularly outward and upward from the inward end 29 of the hanger extension and converge at the hook portion 27. A rectangular extension 31 spaced a short distance from the inward end 29 extends downwardly from the bottom edge 30 of the hanger extension 12 and a vertical slot 32 adjacent the rectangular extension 31 extends upwardly from the bottom edge 30.

As best seen in FIG. 4, when the hanger extension 12 is pressed downwardly against the base plate 11, the inward end 29 of the hanger extension is received in the vertical slot 19 in the base plate 11, the rectangular extension 31 is received in the rectangular opening 24 in the interior of the support block 20, and the front wall 24 of the support block 20 is received in the vertical slot 32 of the hanger extension. Thus, the hanger extension 12 is removably secured at its inward end to the base plate 11 and extends outwardly therefrom in a cantilever fashion. The interfitting connection between the hanger extension 12, the base plate 11, and support block 20 is of sufficient strength to support the torque force or weight placed upon the base plate 11 by the hanger extension 12 when loaded clothes hangers and clothes are hung therefrom.

Depending upon the profile of the automobile interior trim T around the existing garment hook H, it may be necessary to install the support adapter member 13 on the base plate 11 to insure proper support and stability. As best seen in FIG. 1, the support adapter 13 is a generally H-shaped configuration having two parallel rectangular legs 33 spaced apart and joined by a transverse cross bar 34. A plurality of spaced vertical slots 35 are formed in the opposed facing surfaces of each leg 33 on the forward side of the cross bar 34. The width of the slots 35 is slightly larger than the thickness of the intermediate portion 15 of the base plate 11 to be slidably received thereon. The depth of the slots 35 is such that the material between the slots will overlap the front and rear surfaces of the lateral sides of the base plate intermediate portion 15 when the support adapter 13 is received thereon. The ends of the legs 33 opposite the end bearing the slots are provided with a rounded contact surface 36.

To assemble the support adapter 13 on the base plate 11, the adapter is slid over the upper portion 14 of the base plate with the intermediate portion 15 received within the proper opposed slots 35, until the support adapter 13 rests upon the stop shoulder 17 of the base plate 11 as seen in FIGS. 1, 2, 5, and 6. When the support adapter 13 is properly positioned upon the base plate 11, the central rectangular opening 18 of the base plate is not obstructed in any way which would prevent reception of the vehicle's garment hook H. It should be understood that the support adapter 13 is not required in all installations.

Figure 5:
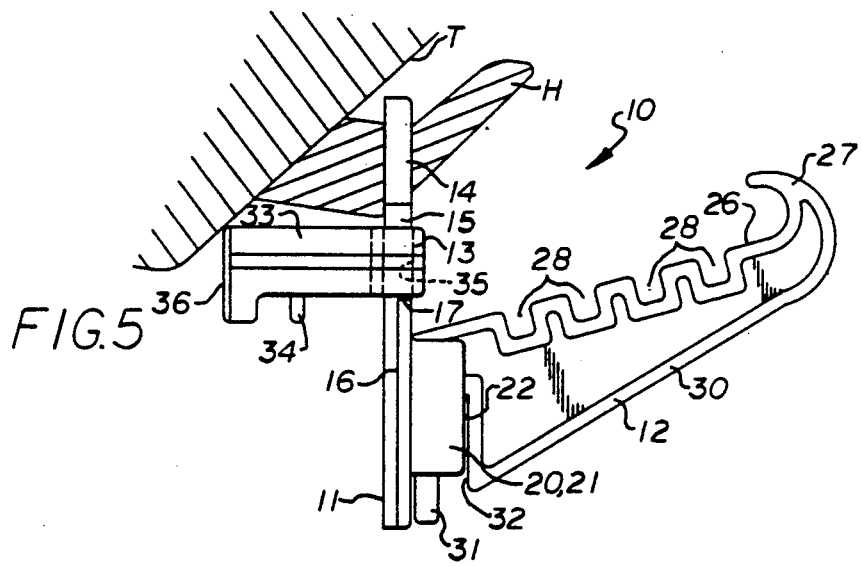
FIG. 5 is a side elevation view of the automobile clothes hanger bracket in the assembled condition with the support adapter member engaged with one type of automobile interior trim.
Figure 6:
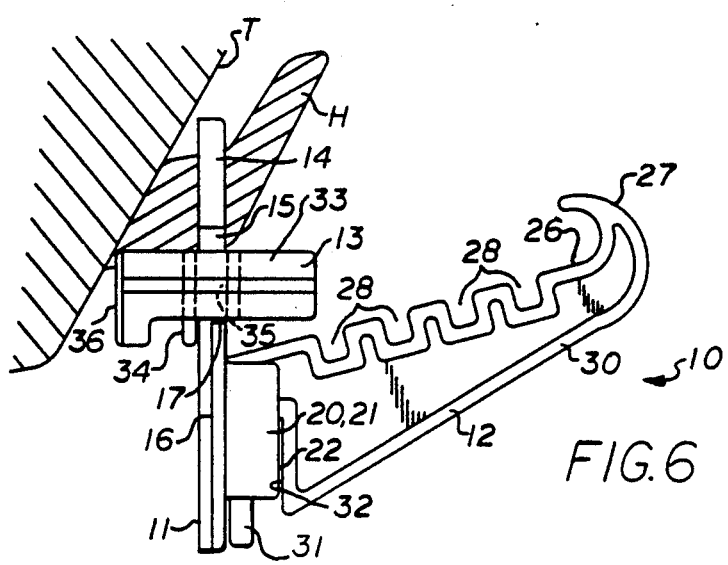
FIG. 6 is a side elevation view of the automobile clothes hanger bracket in the assembled condition with the support adapter member engaged with another type of automobile interior trim.

With the clothes hanger bracket 10 assembled, it is positioned and hung from the existing garment hook H such that the hook H is received through the central rectangular opening 18 of the base plate 11. The base plate 11 is pivoted downward until it rests against the interior trim of the automobile and is in a generally vertical position. If the support adapter 13 is used, the base plate 11 is pivoted downward until the rounded contact surfaces 36 of the support adapter 13 are engaged against the interior body trim T of the vehicle upon which the garment hook H is affixed, as seen in FIGS. 5 and 6. The clothes hangers, clothes, etc., can then be positioned upon the hanger extension member 12.

FIG. 5 shows the clothes hanger bracket 10 installed on a garment hook H of an automobile having interior trim with an angular profile wherein the forwardmost slot 35 of the support adapter 13 is used. FIG. 6 shows the clothes hanger bracket 10 installed on a garment hook H of an automobile having interior trim T which has an angled profile less than that of FIG. 5, wherein the rearmost slot of the support adapter 13 is used.

When properly positioned, the base plate 11 is supported from the garment hook H in a generally vertical position and is engaged on the interior trim T of the automobile and the hanger extension 12 is positioned somewhat perpendicular to the base plate. The notched top surface 26 of the hanger extension 12 extends outwardly and angularly upwardly from the base plate 11 relative to the horizontal plane.

With the clothes hanger bracket 10 in place, conventional clothes hangers C may be hung and supported upon the hanger extension 12 whereby garments and clothing, such as shirts and coats can be conveniently carried in the interior of an automobile or other vehicle. The present clothes hanger bracket is also useful as an advertising medium for dry cleaners, car washes, etc., through positioning of an advertising message, logo, etc., on the front surface of the base plate 11 at either or both sides of the support block 20.

OPERATION

While the use of the present automobile clothes hanger bracket should be apparent from the above description, it will be repeated for clarity.

The base plate 11 is held next to the existing garment hook H with the rectangular opening 18 positioned adjacent the hook to determine if the hook will fit inside the opening. If the hook is wider than the opening, then the tabs 25 are removed by bending their lower portions inwardly until they break off. The base plate 11 is then placed on the hook H to determine if it will rest in a generally vertical position against the interior trim T. If it will not, then the support adapter 13 is placed over the intermediate portion 15 of the base plate 11 to determine which pair of slots 35 should be used to position the base plate generally vertical.

The hanger extension member 12 is then pressed downwardly against the base plate 11 with the inward end 29 of the hanger extension received in the vertical slot 19 in the base plate, the rectangular extension 31 received in the rectangular opening 24 in the interior of the support block 20, and the front wall 22 of the support block 20 received in the vertical slot 32 of the hanger extension 12.

The support adapter 13 is slid over the upper portion 14 of the base plate 11 with the intermediate portion 15 received within the proper opposed slots 35, until the support adapter rests upon the stop shoulder 17 of the base plate. When the support adapter 13 is properly positioned upon the base plate 11, the central rectangular opening 18 of the base plate is not obstructed in any way which would prevent reception of the vehicle's garment hook H.

With the clothes hanger bracket 10 assembled, it is positioned and hung from the existing garment hook H such that the hook H is received through the central rectangular opening 18 of the base plate 11. The base plate 11 is pivoted downward until it rests against the interior trim of the automobile and is in a generally vertical position. If the support adapter 13 is used, the base plate 11 is pivoted downward until the rounded contact surfaces 36 of the support adapter are engaged against the interior body trim T of the vehicle upon which the garment hook H is affixed.

When properly positioned, the base plate 10 is supported from the garment hook H in a generally vertical position and is engaged on the interior trim T of the automobile and the hanger extension 12 is positioned somewhat perpendicular to the base plate 11. The notched top surface 26 of the hanger extension 12 should extend outwardly and angularly upwardly relative to the horizontal plane.

With the clothes hanger bracket 10 in place, conventional clothes hangers C may be hung and supported upon the hanger extension 12 whereby garments and clothing, such as shirts and coats can be conveniently carried in the interior of an automobile or other vehicle. Caps or hats may be hung from the hooked portion 27 of the hanger extension 12. The clothes hanger bracket 15 may be left in place when not in use, or may be disassembled and stored in a small space such as a glove box or console.

While this invention has been described fully and completely with special emphasis upon a preferred embodiment, it should be understood that within the scope of the appended claims the invention may be practiced otherwise than as specifically described herein.

I claim:

1. A removable and adjustable clothes hanger bracket for mounting on a fixed garment hook in the interior of a vehicle to increase the garment carrying capacity comprising;
   a generally flat rectangular base plate having an adjustable opening at its upper end for hanging said base plate on the fixed garment hook,
   said adjustable opening being selectively adjustable in size to receive fixed garment hooks of various different sizes, and
   a hanger extension member having an inner end removably connected to said base plate and an outer end extending upwardly and outwardly therefrom and having a notched top surface therebetween for supporting a plurality of garment hangers.

2. The clothes hanger bracket according to claim 1 wherein
   said hanger extension member is a generally flat triangular configuration having a top edge and a bottom edge extending outwardly and upwardly from said inner end and converging together at said outer end and said top edge having a plurality of spaced apart notches formed therein along its length, and
   said outer end terminating in an upwardly curved hook portion.

3. The clothes hanger bracket according to claim 1 wherein
   said adjustable opening at the upper end of said base plate is a central rectangular opening extending through the upper portion of said base plate, and
   a pair of removable elements disposed in said opening and spaced laterally inward from the side edges of said opening for selectively altering the size of said opening to receive different sizes of fixed garment hooks.

4. The clothes hanger bracket according to claim 3 wherein
   said removable elements comprise a pair of parallel spaced thin tabs extending from one edge of said opening which may be selectively removed, whereby
   when said tabs are in place, said opening is a first size to receive fixed hooks within a predetermined range of sizes and when removed, said opening is a second size to receive fixed hooks within another predetermined range of sizes.

5. The clothes hanger bracket according to claim 1 wherein
   the vehicle interior has interior trim adjacent the fixed garment hook, and
   said generally flat rectangular base plate has a support adapter element removably received thereon to extend between said base plate and the interior trim for supporting said base plate in a generally vertical position.

6. The clothes hanger bracket according to claim 5 wherein
   said generally flat rectangular base plate has an upper portion, an intermediate portion therebelow which is wider than said upper portion, and a lower portion which is wider than said intermediate portion to define a shoulder therebetween, and
   said support adapter member is removably and slidably received on said intermediate portion and supported on said shoulder and has a rearward portion extending rearwardly from said base plate to engage the interior trim, and
   said rearward portion is adjustable relative to said base plate whereby said rearward portion may be positioned a selective distance rearwardly from said base plate to engage different types of interior trim configurations.

7. The clothes hanger bracket according to claim 6 wherein
   said support adapter element is a generally H-shaped configuration having generally rectangular parallel legs spaced apart and joined by a transverse cross bar, and
   a plurality of longitudinally spaced vertical slots formed in the opposed facing surfaces of each said leg to be slidably received on the lateral edges of said base plate and engage said shoulder, and
   the ends of said parallel legs having a contact surface at one end adapted to rest on the outer surface of said interior trim, whereby
   said the relative distance between said contact surfaces and said base plate may be adjusted by selecting an appropriate pair of said slots and sliding said support adapter element onto said base plate intermediate portion.

8. The clothes hanger bracket according to claim 1 wherein
   said generally flat rectangular base plate has a slotted portion and a support portion to removably receive and support said hanger extension member thereon, and
   said hanger extension member is a generally flat triangular configuration with its said inner end configured to be slidably received and supported in said base plate slotted portion and support portion, whereby
   said hanger extension member and said base plate may be disconnected from each other and stored in a small compact configuration.

9. The clothes hanger bracket according to claim 8 wherein
   said base plate slotted portion is a narrow vertical slot extending downwardly a distance from the bottom edge of said opening, and said base plate support portion is a generally rectangular configuration formed on the front surface of said base plate, said rectangular configuration having parallel side walls extending outwardly from the front surface of said base plate at each side of said vertical slot and a front wall spaced outwardly from said vertical slot to define a rectangular vertical opening in the interior of said support portion.

10. The clothes hanger bracket according to claim 8 wherein said hanger extension member inner end has a flat edge shaped to be received in said base plate vertical slot, a rectangular extension spaced a short distance from said flat edge extending downwardly from the bottom edge said hanger extension to be received in the vertical opening in said base plate support portion, and a vertical slot adjacent said rectangular extension extending upwardly from the bottom edge of said hanger extension member to receive said support portion front wall.

11. The clothes hanger bracket according to claim 1 wherein said generally flat rectangular base plate has a flat front surface including an area of sufficient size for receiving and visually displaying indicia or printed matter.

* * * * *